United States Patent [19]

Wellman

[11] Patent Number: 4,509,371

[45] Date of Patent: Apr. 9, 1985

[54] VENTURI FLOW MEASURING DEVICE AND METHOD

[75] Inventor: Donald C. Wellman, Marcellus, N.Y.

[73] Assignee: Carrier Corporation, Syracuse, N.Y.

[21] Appl. No.: 456,633

[22] Filed: Jan. 7, 1983

[51] Int. Cl.³ .............................................. G01F 1/00
[52] U.S. Cl. ......................................... 73/861; 73/3; 73/227; 73/861.63
[58] Field of Search ................ 73/861.64, 861.63, 197, 73/195, 3, 227, 861.65, 861.67, 861

[56] References Cited

U.S. PATENT DOCUMENTS

| | | | |
|---|---|---|---|
| 944,417 | 12/1909 | Connet | 73/861.64 |
| 3,374,673 | 3/1968 | Trageser | 73/861.63 X |
| 3,410,138 | 11/1968 | Lynch | 73/197 |
| 3,445,335 | 5/1969 | Gluntz | 73/861.63 |
| 3,733,901 | 5/1973 | Halmi | 73/861.64 |
| 3,733,903 | 5/1973 | Halmi | 73/861.64 |
| 4,217,777 | 8/1980 | Newman | 73/227 X |

Primary Examiner—James L. Rowland
Assistant Examiner—Brian R. Tumm
Attorney, Agent, or Firm—David J. Zobkiw

[57] ABSTRACT

A planar venturi is located at the discharge of an air conditioning unit to form a part of the unit and to stabilize flow. A plurality of sensor locations are provided in the diverging portion of the venturi such that a velocity sensor can be located in the sensor location appropriate for the highest range of sensor accuracy. The velocity is a measure of the volume flow which is the product of the cross section of the flow at the sensor location and the sensed velocity.

5 Claims, 4 Drawing Figures

VENTURI FLOW MEASURING DEVICE AND METHOD

BACKGROUND OF THE INVENTION

In a variable air volume, zoned, blow through unit with integrally packaged controls, a single variable speed fan supplies air for distribution to each of the zones. Each of the zones has a pair of independent dampers, a cooling damper and a neutral/heating damper, controlling the respective flow paths to the zone. The cooling damper is located in a first flow path downstream of the cooling coil which cools the air for all of the zones. The neutral/heating damper is located in a second flow path upstream of a selectively operated zone heating coil. The first and second flow paths combine downstream of the dampers which control the amount of flow to the respective zones. Due to the change in flow paths, either through the cooling damper or neutral/heating damper, and the unstable air flow from a zone plenum into a conventional flanged duct connection, establishing a stable zone air flow measurement point at the unit discharge is extremely difficult. One approach, often tried, to stabilize air flow is the use of a perforated metal plate. However, this causes a substantial increase in flow resistance with the resulting expenditure of additional fan energy. Further, the losses due to the resistance of the perforated plate cause problems for system powered devices which have been designed to close at pressures at least as low as 0.25 inches of water so that normally small losses become significant. Although velocity pressure can be determined as the difference between the total pressure and the static pressure at the throat of a venturi, only the throat is a proper measurement location so that different sensors would be required according to the sensed pressure range in order to remain within the range of highest sensor accuracy.

SUMMARY OF THE INVENTION

The present invention is directed to the establishment of stable area(s) for flow measurement, at the unit, without producing unnecessary flow losses or requiring long distances for turbulence to settle out. More specifically a two dimensional, planar venturi is used at the zone discharge to create a stable flow point for velocity measurement. The venturi is designed to ideally expand the air to the zone duct dimensions. The use of the venturi at the zone duct entrance substantially reduces air flow losses. At normal zone duct velocities, duct entrance losses are nearly unmeasurable while the losses in a conventional flanged duct connection are 0.25 to 0.30 inches of water. Further, at constant air volume air flow conditions through a zone, a range of air velocities can be read by positioning a flow sensor at different venturi cross sections downstream of the venturi throat. A velocity sensor therefore can be located in the venturi at a cross section that permits its usage in its highest accuracy range. The selection of the sensor location would depend on zone cfm design requirements. Since the venturi cross section can be readily determined, the product of the cross sectional area and the velocity at any point represents the flow. If temperature compensation is required or desired, temperature will be sensed in addition to the velocity to provide the zone supply data.

It is an object of this invention to provide a location of stabilized flow at the unit even if the air flow conditions and paths are being changed.

It is a further object of this invention to provide a range of stabilized flow to permit measurement within the highest range of sensor accuracy.

It is another object of this invention to provide a method for accurately measuring the volume rate of flow of a fluid subject to varying temperature, pressure and flow rates.

It is an additional object of this invention to provide a range of stabilized flow having a plurality of selectable sensing locations in different portions of the range of stabilized flow.

It is another object of this invention to provide a sensor location on the unit so that the sensor can be part of the shipped package and not subject to installation errors.

It is a further object of this invention to provide an area of stabilized flow while minimizing flow losses created thereby. These objects, and others as will become apparent hereinafter, are accomplished by the present invention.

Basically, a venturi is located in a distribution line of a variable air volume system immediately downstream of the zone mixing chamber so as to form a part of the unit. Sensor locations are set at the locations of several different cross sectional areas of the venturi so as to permit a sensor to be located at a stable airflow point in a velocity range consistent with the most accurate velocity range of the flow sensor. Thus, at a constant volume, different velocities can be read at different sensor locations where turbulence is reduced/eliminated.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
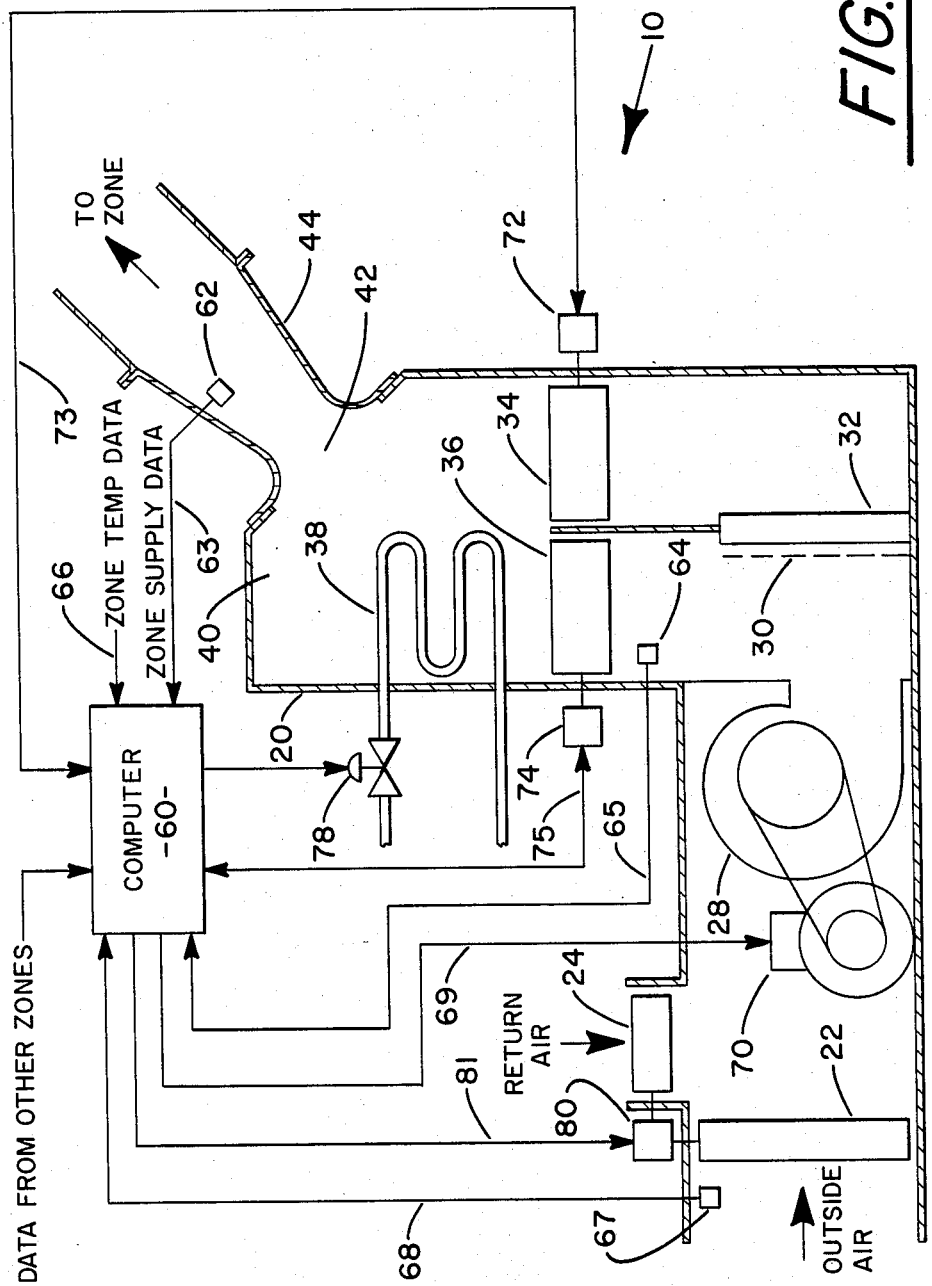
FIG. 1 is a schematic representation of the controls for a variable air volume multizone system employing the present invention.
Figure 2:
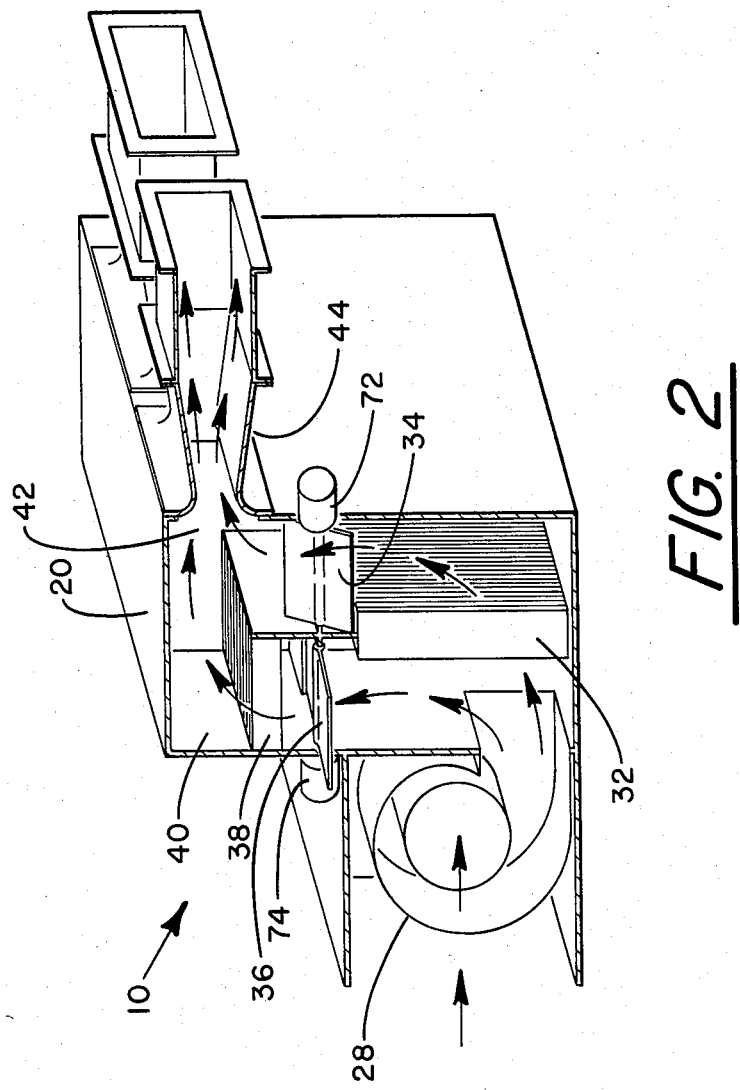
FIG. 2 is a partially cutaway view of a modified air distribution system.

In FIGS. 1 and 2 the numeral 10 generally designates a variable volume multizone unit. Outside air or a return and outside air mixture is supplied via linked dampers 22 and 24 to the inlet of variable speed fan 28. Air supplied by fan 28 passes into the zone section 40 of variable multizone section 20 by either, or both, of two routes. The first route is through perforated plate 30 which provides good air distribution across the chilled water cooling coil 32 when air is flowing through damper(s) 34 but prevents cooling coil wiping by air flowing through damper(s) 36. The flow then passes through chilled water coil 32 where the flow divides and passes through dampers 34 which respectively control the supply of cooling air to each zone. The second route into the zone sections 40 of multizone section 20 is via dampers 36 which respectively control the supply of neutral air to each zone. A zone hot water or electric heat coil 38 is located downstream of each damper 36 to prevent heating coil wiping and, when activated, heats the neutral air to supply warm air to the zone. The cool, neutral or warm air passes from each zone section or unit 40 by way of discharge 42 which may be vertical, horizontal as illustrated in FIG. 2 or, at 45° from vertical as illustrated in FIG. 1.

The air volume passing through each zone section or unit 40 can vary from no flow or minimum ventilation flow to full flow and at a static pressure that reflects zone and system requirements as well as the pressure changes due to thermal expansion/contraction in going through the coils 32 and, when activated, coil 38. Also, to meet cooling and minimum ventilation flow, a mix of cool and neutral air may take place. All of these factors, in addition to the turbulence in the flow passing from a conventional unit discharge, combine to make it difficult to accurately measure the flow from each zone section or unit 40.

Figure 3:
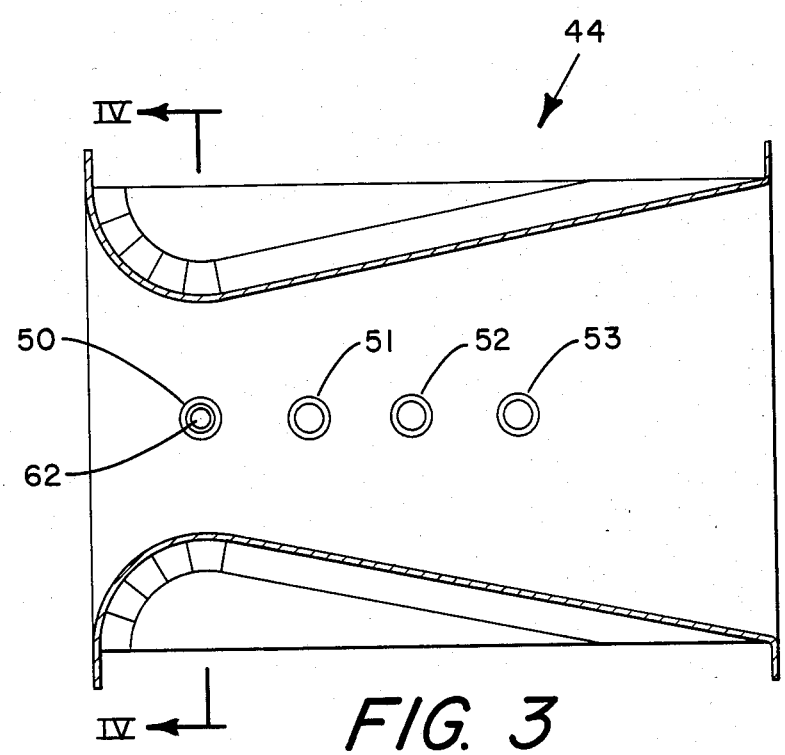
FIG. 3 is a side view of the venturi section.
Figure 4:
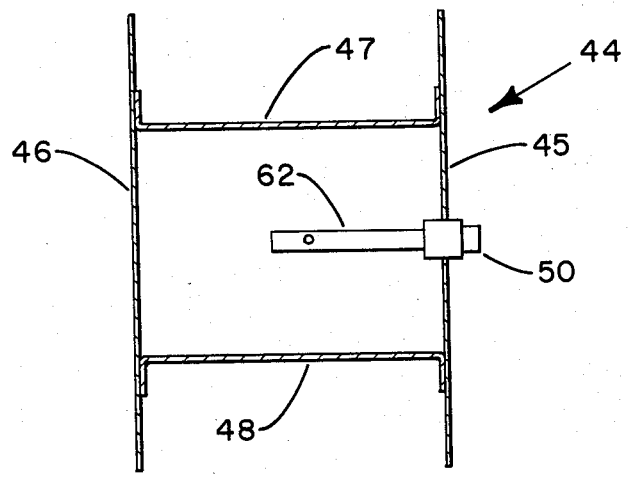
FIG. 4 is a sectional view taken along line IV—IV of FIG. 3.

According to the present invention, a venturi section 44 is located at or near discharge 42 and receives all flow going to the zone in a smooth transition which reduces or eliminates turbulence. The system is operated to satisfy the temperature requirements of each zone and to maintain a minimum air flow in those zones with satisfied temperature requirements. Additionally, the speed of fan 28 is regulated so as to provide sufficient air flow at minimum air speed. This is done by slowing the fan down to cause the dampers to be opened wider to achieve sufficient flow. The opening of the dampers reduces the flow resistance and the fan speed is adjusted so that at least one damper is fully open and the zone temperature requirements met. Referring now to FIG. 1, it will be noted that each zone supplies information to computer 60 indicative of the zone temperature, zone supply conditions and damper positions. Since changes at the variable volume multizone unit 10 take time to reach the zones, the zones are individually polled in a cyclic sequence and only the connections to a single zone are illustrated in detail. A space temperature sensor (not illustrated) supplies zone temperature data to computer 60 via line 66. A second signal representing the velocity (volume) flow or velocity and temperature of flow to the zone is supplied to computer 60 via line 63 by sensor 62 which is located in the flow path of venturi section 44. Referring now to FIGS. 2-4, it will be noted that venturi section 44 has two flat sides, 45 and 46, and two curved sides, 47 and 48, so that the cross section is always rectangular. At a number of axially spaced locations, couplings 50–53, are provided for selectively locating sensor 62 and these couplings 50–53 are each at different cross sectional areas of the venturi section 44. The sensor 62 is a velocity sensor or a velocity and temperature sensor and the locations of couplings 50–53 is in the diverging section of the venturi with coupling 50 being at the throat/transition to diverging flow. Flow in the converging section of the venturi is not stable so that coupling 50 is at the extreme suitable upstream position. By locating the sensor 62 at a known cross sectional area of the venturi section and supplying this information to computer 60, the velocity information sensed by sensor 62 and supplied to computer 60 furnishes the velocity/flow information for the zone. Also the velocity information can be used to determine proper sensor location. Although there is a pressure drop in the air passing through venturi section 44, there is a pressure recovery such that there is a negligible pressure drop in the air supplied to the zone. Because a plurality of sensor locations, 50–53, are provided, the sensed velocity can be kept within the highest accuracy range of the sensor 62 for the design air flow required. This becomes a factor in some parts of the building when zone cfm requirements differ substantially from the other zones because of zone size and zone air conditioning load. The sensor 62 can be a two thermistor sensor or have one diode (flow) and one thermistor (temperature) where both temperature and flow are measured so that the flow can be temperature compensated for mass flow. Solid state velocity measuring sensors of the type suitable for use as the sensors are manufactured by Cambridge Aero Instruments Inc. of Bedford, Mass. A damper position feedback signal is supplied to computer 60 via line 73 by damper controller 72 and via line 75 by damper controller 74. If in polling all of the zones one of the dampers is fully open and the zone flow and/or temperature requirements are not met, computer 60 sends a signal via line 69 to fan motor 70 causing it to speed up. If in polling all of the zones at least one of the dampers is fully open and all of the zone flow and temperature requirements are met, no changes are made. If in polling all of the zones the flow and temperature requirements are met but no damper is fully open, computer 60 sends a signal via line 69 to motor 70 causing it to slow down.

The system can be operated in an economizer cycle in which the outside air quantity brought into the building is controlled to achieve minimum energy usage for cooling and to permit shut down of the refrigeration machine when the outside air source will provide the supply air temperature required for cooling. The controls for the economizer loop consist basically of outside air temperature sensor 67, fan discharge temperature sensor 64, space temperature sensor (not illustrated) and damper actuator 80. Computer 60 receives the inputs from the temperature sensor 67 via line 68 and from temperature sensor 64 via line 65 and controls damper actuator 80 to maintain minimum fresh air requirements and to use the economizer cycle when the outside air will provide the cooling requirements.

In summary, the present invention permits the sensor 62 to be located at the unit 10 which permits the sensor to be a part of the shipped package. Velocity or velocity and temperature are sensed at any one of several locations whereby the measured velocity range can be matched to the range of highest sensor accuracy and thereby a standard sensor can be used for a range of zone flow demands and be used within its highest accuracy range.

Although a preferred embodiment of the present invention has been illustrated and described, other changes will occur to those skilled in the art. It is therefore intended that the scope of the present invention is to be limited only by the scope of the appended claims.

What is claimed is:

1. A method for determining the variable volume flow rate of a fluid subject to varying temperature, pressure and flow paths comprising the steps of:

directing all of the fluid into a single fluid path;
passing all of the fluid in the single fluid path through a converging-diverging section to stabilize by sequentially accelerating and decelerating the fluid flow therethrough;
selecting a single point from a plurality of axially spaced predetermined locations along said diverging section at points of differing cross-sectional area for measuring the velocity of fluid flow so that the measured velocity is within a predetermined range; and measuring the velocity of fluid flow at said single point whereby the variable volume rate of flow is the product of the measured velocity and the cross sectional area at that location.

2. The method of claim 1 wherein said converging-diverging section is located upstream of a zone distribution duct of a variable volume air conditioning unit.

3. The method of claim 1 wherein the converging-diverging section is located downstream of a variable volume air conditioning unit having heating and cooling coils.

4. Volumetric flow measuring planar venturi structure comprising:

a pair of planar walls;

a pair of curved walls coacting with said pair of planar walls to define a converging-diverging flow path with a rectangular cross section;

a plurality of axially spaced sensor locations along said diverging flow path at points of differing cross sectional area; and velocity sensing means adapted to be selectively located at any single one of said plurality of axially spaced sensor locations whereby the volumetric flow is the product of the sensed velocity and the cross sectional area at the selected sensor location.

5. The volumetric flow measuring venturi structure of claim 4 wherein said venturi structure forms a part of the air distribution flow path of a zone of a variable volume air conditioning system.

* * * * *